United States Patent
Gupta et al.

(10) Patent No.: US 12,507,019 B2
(45) Date of Patent: Dec. 23, 2025

(54) SYSTEMS AND METHODS HAVING MULTI-AXIS SENSITIVITY AND TRANSLATIONAL MODE SHAPES

(71) Applicant: Georgia Tech Research Corporation, Atlanta, GA (US)

(72) Inventors: Pranav Gupta, Atlanta, GA (US); Farrokh Ayazi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 62 days.

(21) Appl. No.: 17/338,833

(22) Filed: Jun. 4, 2021

(65) Prior Publication Data
US 2021/0385586 A1    Dec. 9, 2021

Related U.S. Application Data

(60) Provisional application No. 63/034,540, filed on Jun. 4, 2020.

(51) Int. Cl.
*H04R 19/04* (2006.01)
*G01P 15/08* (2006.01)
(Continued)

(52) U.S. Cl.
CPC .......... *H04R 19/04* (2013.01); *G01P 15/0802* (2013.01); *H04R 1/04* (2013.01);
(Continued)

(58) Field of Classification Search
CPC ............ G01C 19/5712; G01C 19/5769; G01C 19/5755; H04R 19/04; H04R 3/00;
(Continued)

(56) References Cited

U.S. PATENT DOCUMENTS 6,367,786 B1 * 4/2002 Gutierrez ........... G01C 19/5719
73/514.32
10,473,687 B1 * 11/2019 Resnick ................ G01P 15/125
(Continued)

OTHER PUBLICATIONS

Gupta et al, Precision High Bandwidth Out of Plane Accelerometer as Contact microphone for body auscultation devices (Year: 2018).*
(Continued)

*Primary Examiner* — Walter F Briney, III
*Assistant Examiner* — Kuassi A Ganmavo
(74) *Attorney, Agent, or Firm* — TROUTMAN PEPPER LOCKE LLP; Ryan A. Schneider; Nicholas H. Doss

(57) ABSTRACT

A hermetically-sealed multi-directional single-proof-mass accelophone that demonstrates a high sensitivity to microgravity level accelerations in a wide operational bandwidth by utilizing nano-scale transductions gaps and vacuum packaging. Stable operation of the wafer-level-packaged sensor is validated over a wide operational bandwidth greater than 10 kHz. Developing a noise-matched custom interface IC should enable a sensor noise performance near the Brownian noise floor of below 10 μg/√Hz. The sensor can be applied in detection of vital mechano-acoustic signals emanating from the body and can be easily incorporated in existing wearable health monitoring devices for multi-faceted health monitoring using a single integrated sensor.

26 Claims, 11 Drawing Sheets

(51) Int. Cl.
  *G01P 15/125*    (2006.01)
  *G01P 15/18*     (2013.01)
  *H04R 1/04*      (2006.01)
  *H04R 1/32*      (2006.01)
  *H04R 1/46*      (2006.01)
  *H04R 3/00*      (2006.01)

(52) U.S. Cl.
  CPC ............ *H04R 1/326* (2013.01); *H04R 1/46* (2013.01); *H04R 3/00* (2013.01); *G01P 2015/0808* (2013.01); *G01P 2015/084* (2013.01); *G01P 2015/0871* (2013.01); *G01P 15/125* (2013.01); *G01P 15/18* (2013.01); *H04R 2201/003* (2013.01)

(58) Field of Classification Search
  CPC .. H04R 2201/003; H04R 1/04; H04R 1/3226; H04R 1/46; G01P 15/0802; G01P 15/18; G01P 2015/0808; G01P 2015/084; G01P 2015/0871
  See application file for complete search history.

(56) References Cited

U.S. PATENT DOCUMENTS

| | | | | |
|---|---|---|---|---|
| 2003/0029238 | A1* | 2/2003 | Challoner | G01C 19/5719 73/504.04 |
| 2005/0005698 | A1* | 1/2005 | McNeil | G01P 15/18 73/514.32 |
| 2009/0090184 | A1* | 4/2009 | Wang | G01P 15/125 73/514.24 |
| 2009/0280594 | A1* | 11/2009 | Mehregany | B81C 1/00182 257/E21.211 |
| 2011/0209343 | A1* | 9/2011 | Mehregany | G01P 15/131 29/847 |
| 2013/0192364 | A1* | 8/2013 | Acar | G01P 15/18 73/504.12 |
| 2014/0165723 | A1* | 6/2014 | Ma | G01C 19/56 73/504.12 |
| 2015/0185012 | A1* | 7/2015 | Acar | G01P 15/125 73/504.12 |
| 2015/0316377 | A1* | 11/2015 | Gerson | G01C 19/574 73/504.15 |
| 2015/0362522 | A1* | 12/2015 | Simoni | G01P 15/097 73/514.29 |
| 2016/0139170 | A1* | 5/2016 | Dwyer | G01P 15/03 73/514.29 |
| 2016/0152202 | A1* | 6/2016 | Rytkönen | G01P 15/18 73/514.38 |
| 2016/0370397 | A1* | 12/2016 | Lin | G01P 15/18 |
| 2018/0188028 | A1* | 7/2018 | Jeong | G01C 19/5712 |
| 2018/0275161 | A1* | 9/2018 | Tang | G01P 15/18 |
| 2019/0120872 | A1* | 4/2019 | Geisberger | G01P 15/125 |
| 2019/0162747 | A1* | 5/2019 | Thompson | G01P 15/125 |
| 2019/0212144 | A1* | 7/2019 | Thompson | G01C 19/56 |
| 2020/0096538 | A1* | 3/2020 | Zhang | G01P 15/18 |
| 2020/0132716 | A1* | 4/2020 | Zhang | G01P 15/125 |
| 2021/0127202 | A1* | 4/2021 | Ayazi | H04R 19/04 |

OTHER PUBLICATIONS

Jeong et al, An Out of Plane Hinged Shaped Nano gap accelerometer with high sensitivity and wide bandwidth (Year: 2018).*
Jeong et al, Shock Protection of Nano gap capacitive MEMS accelerometers using sloped electrode design (Year: 2017).*

* cited by examiner

Prior Art

300

$F_{res}$ = 9.8 kHz $F_{res}$ = 10.1 kHz $F_{res}$ = 10.3 kHz

SYSTEMS AND METHODS HAVING MULTI-AXIS SENSITIVITY AND TRANSLATIONAL MODE SHAPES

CROSS-REFERENCE TO RELATED APPLICATIONS

This application claims benefit under 35 USC § 119(e) of U.S. Provisional Patent Application No. 63/034,540 filed 4 Jun. 2020, the entirety of which is incorporated herein by reference as if set forth herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present invention relates to systems and methods having multi-axis sensitivity and translational mode shape. In particular, but not exclusively, the present invention relates to a hermetically-sealed micro-electromechanical system (MEMS) device, particularly an accelerometer contact microphone, also known as contact accelophone, used to capture motion and acoustic vibrations of a contact surface in a wide frequency spectrum ranging from DC to greater than 10 kHz.

2. Description of Related Art

An accelerometer contact microphone (ACM), or an accelophone, is a quasi-static micro-sensor that unifies the functionality of a DC capacitive accelerometer and a contact microphone into a single device. Such a sensor enables measurement of wideband mechano-acoustic vibrations and motion of a contact surface it is mounted upon with high fidelity. While commercially available piezoelectric contact microphones typically exhibit better than 1 milli-g(rms) integrated noise in a 10 kHz bandwidth, they are unable to measure near DC vibrations/motion and do not provide multi-directional sensitivity. Moreover, their application is often limited by their relatively large size and high cost.

In comparison to typical airborne microphones, contact microphones do not respond to airborne acoustic noises in the environment, and only pick-up vibrations from its contact surface, making them ideal for use in high-noise environments (e.g. aircraft cockpits). Moreover, the airborne microphones are not well-suited to detect sounds propagating inside materials and human body—the acoustic coupling via air is very weak and most of energy is reflected from the boundary into the dense medium (material, tissue, etc.). Additionally, conventional MEMS microphones utilize a thin exposed membrane for acoustic sensing, which can be compromised due to environmental effects such as contact with surface and humidity leading to degradation of the microphone.

These salient characteristics of the ACM make it an effective sensor in capturing vibrational signatures, such as heart and lung sounds, emanating from the human body and can be easily integrated in wearable health monitoring devices. A high sensitivity unidirectional ACM (sensitive in the out-of-plane direction) has been demonstrated, having a wide operational bandwidth, exceeding 10 kHz, along with very-low noise performance, having a noise density lower than 10 $\mu g/\sqrt{Hz}$. High fidelity recording of cardiopulmonary mechano-acoustic signals was demonstrated by placing the ACM on the chest wall. The high sensitivity of the ACM was leveraged to capture the low-amplitude pathological heart sounds ($S_3$ ventricular gallop) from a patient with congestive heart failure, as shown in FIG. 1A. Simultaneous recording of high-frequency lung sounds, and their respiratory phases was also demonstrated using the ACM, validating their feasibility for continuous health monitoring systems (FIGS. 1B, 1C).

However, majority of wearable healthcare applications require multi-axis sensitivity to accurately capture the body motion in three-dimensional (3D) space in conjunction with the mechano-acoustic vibrations. Moreover, vibrational signatures occurring along the surface of the skin have also been demonstrated to hold key information regarding the physiological functioning of internal organs. Therefore, a multi-directional ACM is needed to capture the vibrations along all three directions while maintaining a small size. It is an aim of the present disclosure to overcome some or all of the above-mentioned limitations and provide such a multi-directional device.

BRIEF SUMMARY OF THE INVENTION

Briefly described, in an exemplary embodiment, the present invention is a device comprising a proof-mass, a frame supporting the proof-mass, and one or more sensing electrodes separated from the proof-mass by a sensing gap. The present invention can be a single-proof-mass, multi-directional accelerometer contact microphone exhibiting wide operational bandwidth (>10 kHz) and low noise (Brownian noise<10 $\mu g/\sqrt{Hz}$). The present invention can be a hermetically-sealed device that employs a decoupling frame to enable translational motion in all three directions, and that utilizes dedicated differential sensing electrodes along three axes to minimize cross-axis sensitivity. All the tethers supporting the proof-mass can be formed in the single crystal silicon device layer having for example a 40 $\mu m$ thickness, thereby increasing robustness and manufacturability of the sensor. In an exemplary embodiment, the device is a 3 mm×3 mm vibration sensor exhibiting an open-loop flat gain response from DC to 10 kHz, making it suitable for use in emerging health monitoring applications that require high-precision high-bandwidth vibration sensors The sensing gap can be an out-of-plane sensing gap, wherein upon externally applied acceleration to the device, the proof-mass undergoes motion in an out-of-plane direction or an in-plane direction, changing the size of the out-of-plane sensing gap.

The sensing gap can be an out-of-plane sensing gap, wherein upon externally applied acceleration to the device, the proof-mass undergoes translational motion in an out-of-plane direction, changing the size of the out-of-plane sensing gap.

In exemplary embodiments, the device can be a microelectromechanical system (MEMS) device. In other exemplary embodiments, the device can be a multi-directional contact microphone. In other exemplary embodiments, the device can be an accelerometer contact microphone (ACM).

In exemplary embodiments, the sensing gap can be approximately 1000 nanometers or less. In other exemplary embodiments, the sensing gap can be approximately 500 nanometers or less. In other exemplary embodiments, the sensing gap can be approximately 250 nanometers or less.

In exemplary embodiments, the device can have a constant-gain operational bandwidth ranging from 0 Hz to at least greater than 10 kHz. In other exemplary embodiments, the device can have a constant-gain has a constant-gain frequency spectrum ranging from DC to greater than 10 kHz in at least one direction.

In exemplary embodiments, the device can have a first resonant frequency greater than 10 kHz. In other exemplary embodiments, all resonant frequencies of the device are greater than 10 kHz. In other exemplary embodiments, the device can have a resonant frequency of approximately 14.3 kHz. In other exemplary embodiments, the device has an operational bandwidth determined by the resonant frequency of the device. In other exemplary embodiments, the device has an operational bandwidth determined by the resonant frequency of the device, and the resonant frequency of the device is tunable.

In exemplary embodiments, the proof-mass, the frame, the sensing electrode, and the out-of-plane sensing gap are enclosed within a casing configured to maintain a sub-atmospheric pressure. In other exemplary embodiments, the proof-mass, the frame, the sensing electrode, and the sensing gap can be enclosed within a casing configured to maintain a vacuum pressure of 1-10 Torr.

In exemplary embodiments, an out-of-plane resolution of the device can be better than 10 micro-gravity per root Hz.

In exemplary embodiments, an integrated root mean square (rms) noise of the device in a 10 kHz bandwidth can be smaller than 0.1 percent of gravity level (g).

In exemplary embodiments, the frame can be a hinge-frame that supports the proof-mass with a set of torsional support systems. In other exemplary embodiments, the frame can be a hinge-frame that supports the proof-mass with a set of hybrid flexure systems.

In exemplary embodiments, upon externally applied acceleration to the device, a first set of opposing edges of the hinge-frame can displace greater than the translational motion of the proof-mass.

In exemplary embodiments, each edge of a second set of opposing edges of the hinge-frame can comprise one of the torsional support and/or hybrid flexure systems of the set of torsional support and/or hybrid flexure systems.

In exemplary embodiments, a stiffness of the frame and torsional support and/or hybrid flexure system can be tunable to provide resonant modes of the device apart from a fundamental mode of operation of the device. In other exemplary embodiments, a stiffness of the frame and torsional support and/or hybrid flexure system can be tunable to limit sensitivity of the device to externally applied in-plane and angular accelerations. In other exemplary embodiments, a stiffness of the frame and torsional support and/or hybrid flexure system can be tunable to limit sensitivity of the device to only out-of-plane accelerations, being orthogonal to the plane.

In exemplary embodiments, wherein upon an externally applied acceleration to the device, the proof-mass has a uniform translational displacement in an out-of-plane direction, while opposing edges of the frame are displaced greater than the displacement of the proof-mass, and wherein shock-stop features are located in proximity to the opposing edges of the frame, wherein upon an externally applied acceleration to the device, the proof-mass has a uniform translational displacement in an out-of-plane direction, while the shock-stop features are displaced greater than the displacement of the proof-mass.

In exemplary embodiments, each edge of a second set of opposing edges of the hinge-frame can comprise one of the torsional support and/or hybrid flexure systems of the set of torsional support and/or hybrid flexure systems, wherein each system comprises a center support, and beam flexures, wherein upon externally applied acceleration to the device, the first set of opposing edges of the hinge-frame displace greater than the translational motion of the proof-mass via torsion of at least one of the beam flexures about the center support.

In exemplary embodiments, the device can further comprise at least one damping electrode and shock-stop feature in proximity to each edge of the first set of opposing edges of the hinge-frame.

In exemplary embodiments, each torsional support and/or hybrid flexure system can comprise a center support, and torsional beam flexures, and wherein upon externally applied acceleration to the device, the first set of opposing edges of the hinge-frame displace greater than the translational motion of the proof-mass via torsion of at least two of the torsional beam flexures about the center support.

In exemplary embodiments, each edge of the first set of opposing edges of the hinge-frame can comprise damping electrodes and shock-stop features in an alternating configuration along the length of each edge.

In exemplary embodiments, damping electrodes can be alternatingly fixed to the hinge-frame and fixed to the substrate along the length of each edge.

In another exemplary embodiment of the present invention, a MEMS device comprises a proof-mass, a frame supporting the proof-mass, and sensing electrodes, each sensing electrode separated from the proof-mass by a sensing gap.

The proof-mass can includes one or more sets of apertures, wherein each aperture of the proof-mass has positioned therein one sensing electrode of the sensing electrodes, wherein each sensing gap is approximately 1000 nanometers or less, and wherein the MEMS device has a constant-gain operational bandwidth ranging from 0 Hz to at least greater than 10 kHz.

The MEMS device can further comprise torsional beam flexures, damping electrodes, and shock-stop features, wherein the frame is a center-supported hinge-frame of a hybrid flexure system that includes the torsional beam flexures, wherein the center-supported hinge-frame supports the proof-mass using the torsional beam flexures, wherein each sensing gap is a transduction out-of-plane gap having a single transduction out-of-plane gap size, wherein upon an externally applied acceleration to the MEMS device, the proof-mass undergoes translational motion in an out-of-plane direction, while the center-supported hinge-frame rotates about the center support so a first set of opposing edges of the center-supported hinge-frame are displaced greater than the displacement of the proof-mass, wherein each edge of the first set of opposing edges comprises a portion of the damping electrodes and shock-stop features, and wherein the hybrid flexure system enables implementation of the damping electrodes and shock-stop features in the MEMS device that uses the same single transduction out-of-plane gap size.

The proof-mass can have at least three sets of a pair of apertures, an X-mode set of a first aperture and a second aperture, a Y-mode set of a first aperture and a second aperture, and a Z-mode set of a first aperture and a second aperture, wherein the sensing electrodes comprise at least three sets of a pair of sensing electrodes, an X-mode set of a first sensing electrode and a second sensing electrode, a Y-mode set of a first sensing electrode and a second sensing electrode, and a Z-mode set of a first sensing electrode and a second sensing electrode, wherein in each corresponding set of apertures and sensing electrodes, the first aperture is located a distance from the center of the proof-mass, and the second aperture is located the same distance from the center of the proof-mass as the first aperture, but point reflected about the center of the proof-mass from the first aperture, the first sensing electrode is positioned in the first aperture, the second sensing electrode is positioned in the second aperture, and the symmetrically-reflected locations of the first and second sensing electrodes cancel the effect of angular accelerations of the MEMS device, wherein each sensing gap is approximately 1000 nanometers or less, and wherein the MEMS device has a constant-gain operational bandwidth ranging from 0 Hz to at least greater than 10 kHz.

Each sensing gap can be the same size, being uniformly sized among each sensing electrode and the proof-mass.

At least two of the sensing gaps can be a different size one from the other.

Each of the one or more sets of apertures can include a first aperture located a distance from the center of the proof-mass, and a second aperture located the same distance from the center of the proof-mass as the first aperture, but point reflected about the center of the proof-mass from the first aperture, and wherein the symmetrically-reflected locations of the sensing electrodes positioned in each set of apertures cancel the effect of angular accelerations of the MEMS device.

All resonant frequencies of the MEMS device can be greater than 10 kHz.

In another exemplary embodiment of the present invention, a MEMS device comprises a proof-mass, a frame supporting the proof-mass, and a sensing electrode separated from the proof-mass by a sensing gap of approximately 1000 nanometers or less, wherein the MEMS device has a constant-gain operational bandwidth ranging from 0 Hz to at least greater than 10 kHz.

The proof-mass, the frame, the sensing electrode, and the sensing gap can be enclosed within a casing configured to maintain a sub-atmospheric pressure.

The proof-mass, the frame, the sensing electrode, and the sensing gap can be enclosed within a casing configured to maintain a vacuum pressure of 1-10 Torr.

A first resonant frequency of the MEMS device can be greater than 10 kHz.

Upon an externally applied acceleration to the MEMS device, the proof-mass can have a uniform translational displacement in an out-of-plane direction, while opposing edges of the frame are displaced greater than the displacement of the proof-mass.

Upon an externally applied acceleration to the MEMS device, the proof-mass can have a uniform translational displacement in the out-of-plane direction, while opposing edges of the frame are displaced greater than the displacement of the proof-mass, and wherein shock-stop features are located in proximity to the opposing edges of the frame that are displaced greater than the displacement of the proof-mass.

The MEMs device can further comprise shock-stop features located in proximity to opposing edges of the frame, wherein the proof-mass, the frame, the sensing electrode, and the sensing gap are enclosed within a casing configured to maintain a sub-atmospheric pressure, wherein upon an externally applied acceleration to the MEMs device, the proof-mass has a uniform translational displacement in an out-of-plane direction while opposing edges of the frame are displaced greater than the displacement of the proof-mass, and while the shock-stop features are displaced greater than the displacement of the proof-mass, and wherein a first resonant frequency of the MEMs device is greater than 10 kHz.

In another exemplary embodiment of the present invention, an ACM comprises a proof-mass, a hinge-frame supporting the proof-mass with a set of torsional support systems, and a sensing electrode separated from the proof-mass by an out-of-plane sensing gap, wherein upon externally applied acceleration to the ACM, the proof-mass undergoes translational motion in an out-of-plane direction changing the size of the sensing gap, while a first set of opposing edges of the hinge-frame displace greater than the translational motion of the proof-mass.

Each edge of a second set of opposing edges of the hinge-frame can comprise one of the torsional support systems of the set of torsional support systems, wherein each torsional support system comprises a center support, and torsional beam flexures, and wherein upon externally applied acceleration to the ACM, the first set of opposing edges of the hinge-frame displace greater than the translational motion of the proof-mass via torsion of at least one of the torsional beam flexures about the center support.

The proof-mass, the hinge-frame, the sensing electrode, and the out-of-plane sensing gap can be enclosed within a casing configured to maintain a sub-atmospheric pressure.

The proof-mass, the hinge-frame, the sensing electrode, and the out-of-plane sensing gap can be enclosed within a casing configured to maintain a vacuum pressure of 1-10 Torr.

The ACM can have a constant-gain frequency spectrum ranging from DC to greater than 10 kHz. The ACM can have an operational bandwidth determined by the resonant frequency of the ACM. The ACM can have an operational bandwidth determined by the resonant frequency of the ACM, and wherein the resonant frequency of the ACM is approximately 14.3 kHz. The ACM can have an operational bandwidth determined by the resonant frequency of the ACM, and wherein the resonant frequency of the ACM is tunable.

The out-of-plane sensing gap can be approximately 250 nanometers or less.

An out-of-plane resolution of the ACM can be better than 10 micro-gravity per root Hz.

An integrated root mean square (rms) noise of the ACM in a 10 kHz bandwidth can be smaller than 0.1 percent of gravity level (g).

The ACM can further comprise at least one damping electrode and shock-stop feature in proximity to each edge of the first set of opposing edges of the hinge-frame.

In another exemplary embodiment of the present invention, an ACM comprises a proof-mass, a hinge-frame supporting the proof-mass with a set of hybrid flexure systems, and a sensing electrode separated from the proof-mass by an out-of-plane sensing gap, wherein upon externally applied acceleration to the ACM, the proof-mass undergoes translational motion in an out-of-plane direction changing the size of the sensing gap, while a first set of opposing edges of the hinge-frame displace greater than the translational motion of the proof-mass, wherein each edge of a second set of opposing edges of the hinge-frame comprise one of the hybrid flexure systems of the set of hybrid flexure systems, and wherein a stiffness of the hinge-frame and hybrid flexure system is tunable to provide resonant modes of the ACM apart from a fundamental mode of operation of the ACM.

The stiffness of the hinge-frame and hybrid flexure system can be tunable to limit sensitivity of the ACM to externally applied in-plane and angular accelerations.

The stiffness of the hinge-frame and hybrid flexure system can be tunable to limit sensitivity of the ACM to only out-of-plane accelerations, being orthogonal to the plane.

Each hybrid flexure system can comprise a center support, and torsional beam flexures, and wherein upon externally applied acceleration to the ACM, the first set of opposing edges of the hinge-frame displace greater than the translational motion of the proof-mass via torsion of at least two of the torsional beam flexures about the center support.

The ACM can further comprise at least one damping electrode and shock-stop feature in proximity to each edge of the first set of opposing edges of the hinge-frame.

The ACM can further comprise a substrate, damping electrodes, and shock-stop features, wherein each edge of the first set of opposing edges of the hinge-frame comprises the damping electrodes and shock-stop features in an alternating configuration along the length of each edge, and wherein the damping electrodes are alternatingly fixed to the hinge-frame and fixed to the substrate along the length of each edge.

In another exemplary embodiment of the present invention, a multi-directional contact microphone comprises a proof-mass, a frame supporting the proof-mass, and a sensing electrode separated from the proof-mass by an out-of-plane sensing gap, wherein upon externally applied acceleration to the device, the proof-mass undergoes motion in an out-of-plane direction or an in-plane direction, changing the size of the out-of-plane sensing gap.

The proof-mass, the frame, the sensing electrode, and the out-of-plane sensing gap can be enclosed within a casing configured to maintain a sub-atmospheric pressure.

The multi-directional contact microphone can have a constant-gain has a constant-gain frequency spectrum ranging from DC to greater than 10 kHz in at least one direction.

The out-of-plane sensing gap can be approximately 500 nanometers or less.

An out-of-plane resolution of the multi-directional contact microphone can be better than 10 micro-gravity per root Hz.

An integrated root mean square (rms) noise of the multi-directional contact microphone in a 10 kHz bandwidth can be smaller than 0.1 percent of gravity level (g).

In another exemplary embodiment of the present invention, a MEMS device comprises a proof-mass with one or more sets of apertures, a frame supporting the proof-mass, and sensing electrodes, each sensing electrode positioned in one aperture of the one or more sets of apertures, each sensing electrode separated from the proof-mass by a sensing gap approximately 1000 nanometers or less, wherein the MEMS device has a constant-gain operational bandwidth ranging from 0 Hz to at least greater than 10 kHz.

Each sensing gap can be the same size, being uniformly sized among each sensing electrode and the proof-mass.

At least two of the sensing gaps can be a different size one from the other.

Each of the one or more sets of apertures can include a first aperture located a distance from the center of the proof-mass, and a second aperture located the same distance from the center of the proof-mass as the first aperture, but point reflected about the center of the proof-mass from the first aperture, and wherein the symmetrically-reflected locations of the sensing electrodes positioned in each set of apertures cancel the effect of angular accelerations of the MEMS device.

In another exemplary embodiment of the present invention, a MEMS device comprises a proof-mass with at least three sets of a pair of apertures, an X-mode set of a first aperture and a second aperture, a Y-mode set of a first aperture and a second aperture, and a Z-mode set of a first aperture and a second aperture, a frame supporting the proof-mass, and at least three sets of a pair of sensing electrodes, an X-mode set of a first sensing electrode and a second sensing electrode, a Y-mode set of a first sensing electrode and a second sensing electrode, and a Z-mode set of a first sensing electrode and a second sensing electrode, wherein each sensing electrode is separated from the proof-mass by a sensing gap of approximately 1000 nanometers or less, wherein in each corresponding set of apertures and sensing electrodes, the first aperture is located a distance from the center of the proof-mass, and the second aperture is located the same distance from the center of the proof-mass as the first aperture, but point reflected about the center of the proof-mass from the first aperture, the first sensing electrode is positioned in the first aperture, the second sensing electrode is positioned in the second aperture, and the symmetrically-reflected locations of the first and second sensing electrodes cancel the effect of angular accelerations of the MEMS device and wherein the MEMS device has a constant-gain operational bandwidth ranging from 0 Hz to at least greater than 10 kHz.

All resonant frequencies of the MEMS device can be greater than 10 kHz.

In another exemplary embodiment of the present invention, a MEMS device comprises a proof-mass, a hybrid flexure system that supports the proof-mass, the hybrid flexure system comprising a center-supported hinge-frame that supports the proof-mass using torsional beam flexures, sensing electrodes, each sensing electrode separated from the proof-mass by a transduction out-of-plane gap having a single transduction out-of-plane gap size, damping electrodes, and shock-stop features, wherein upon an externally applied acceleration to the MEMS device, the proof-mass undergoes translational motion in an out-of-plane direction, while the center-supported hinge-frame rotates about the center support so a first set of opposing edges of the center-supported hinge-frame are displaced greater than the displacement of the proof-mass, wherein each edge of the first set of opposing edges comprises a portion of the damping electrodes and shock-stop features, and wherein the hybrid flexure system enables implementation of the damping electrodes and shock-stop features in the MEMS device that uses the same single transduction out-of-plane gap size.

These and other objects, features and advantages of the present invention will become more apparent upon reading the following specification in conjunction with the accompanying drawing figures.

BRIEF DESCRIPTION OF THE DRAWINGS

The accompanying Figures, which are incorporated in and constitute a part of this specification, illustrate several aspects described below.

FIGS. 8A-C shows sensor design and fabrication of the embodiment of the present invention of FIG. 7. FIG. 8A is a SEM view of a fabricated ACM. FIG. 8B include close-up images of the device, tether structures, shock-stop features and sensing electrodes. FIG. 8C illustrates simulated fundamental mode shapes of the ACM.

DETAILED DESCRIPTION OF THE INVENTION

Figure 1A:
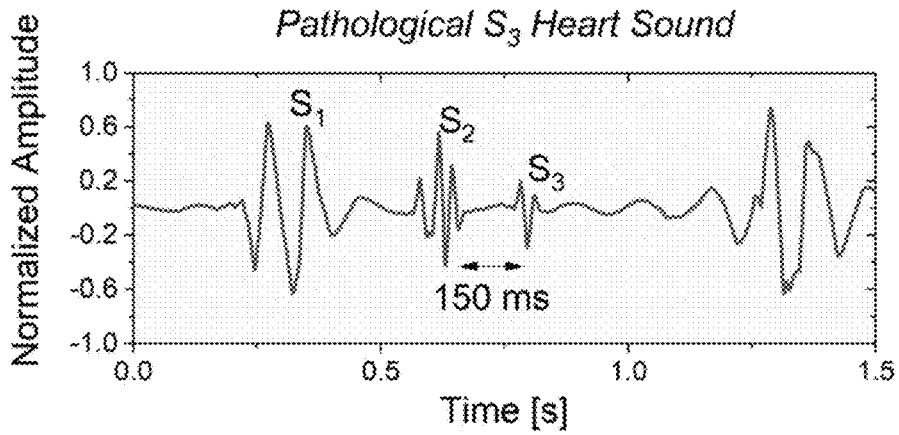
FIGS. 1A-C are graphs from use of a prior art device related to weak pathological heart sounds (FIG. 1A), physiological lung sound (FIG. 1B), and respiratory patterns recorded by placing the ACM on the chest wall (FIG. 1C).
Figure 1B:
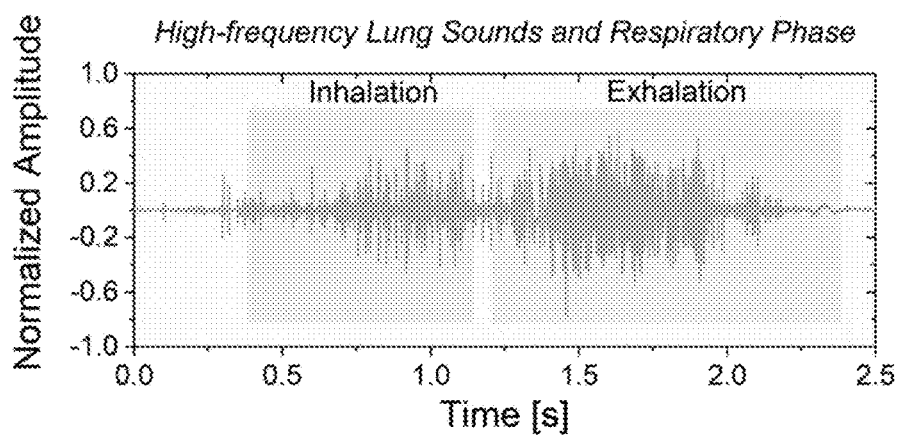
Figure 1C:
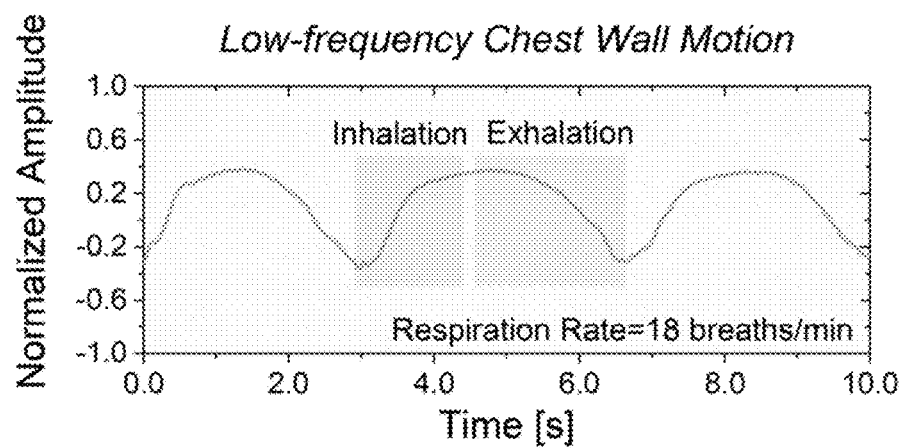

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Figure 2A:
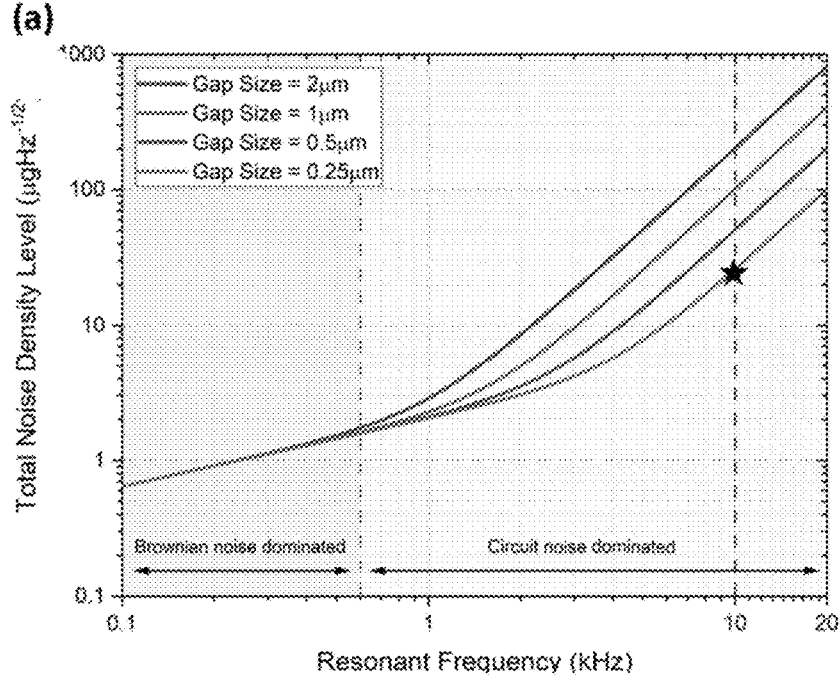
FIG. 2A is a graph showing the effects of scaling down transduction gaps to sub-micron levels for implementation of wideband accelophones). 250 nm gaps provide improved sensitivity with along with lower noise density level. Simulations assume a 2 mm×2 mm device with 1 pF static sense capacitance.
Figure 2B:
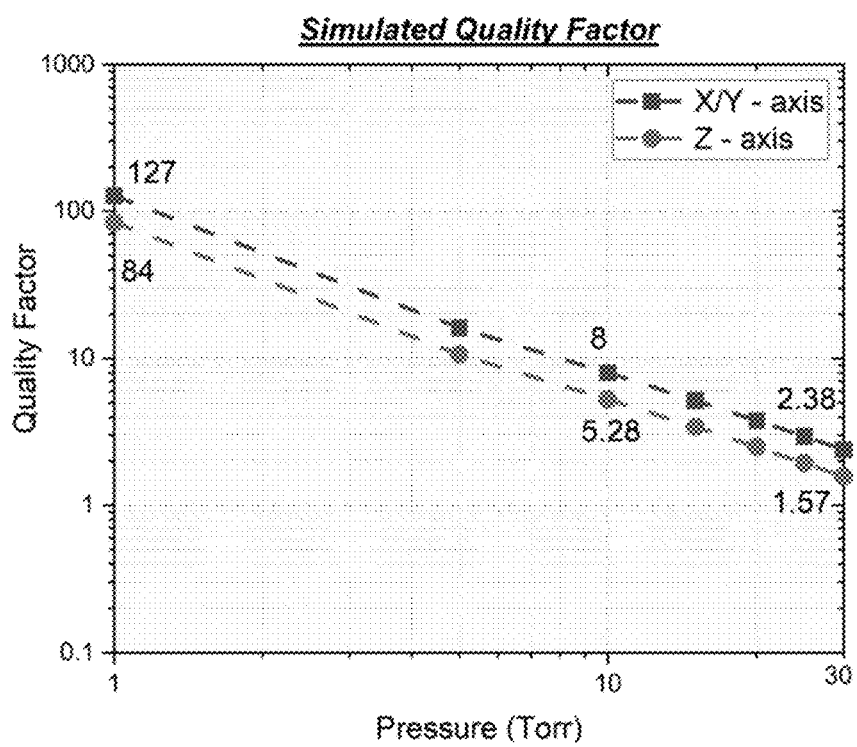
FIG. 2B is a graph illustrating the simulated quality factor for the present accelophone to operate at about 20 Torr pressure level.

The present invention can be modelled as a second-order system, wherein the proof-mass displaces due to acoustic vibrations from its contact surface and causes a change in capacitance between the sensing electrode and the proof-mass. To capture most of the acoustic vibrations, the device requires a minimum operational bandwidth of 10 kHz. However, as shown in FIGS. 2A-B, increased operational bandwidth requires a high resonant frequency, consequently reducing the displacement of the proof-mass significantly, to the order of a few nanometers. Detection of such small displacements using capacitive transduction is extremely challenging due to substantial degradation of the signal-to-noise ratio. Hence, the transduction gap size is scaled to sub-micron levels (250 nm), effectively increasing the ratio between displacement and capacitive transduction gap, to achieve a higher signal strength.

Moreover, the resonant frequency of the MEMS structure along with the air damping caused by the nano-scale capacitive gaps dictates the operational bandwidth of such a device. The present invention is designed to operate at low pressure levels of about 20 Torr to efficiently control the squeeze film damping and minimize the environmental degradation effects on the sensor. Additional damping electrodes are implemented to achieve critical damping, thus avoiding ringing and overshoot, and extending the bandwidth to the maximum limit while making it feasible to be integrated with other resonant sensors such as gyroscopes for sensor fusion.

Figure 3:
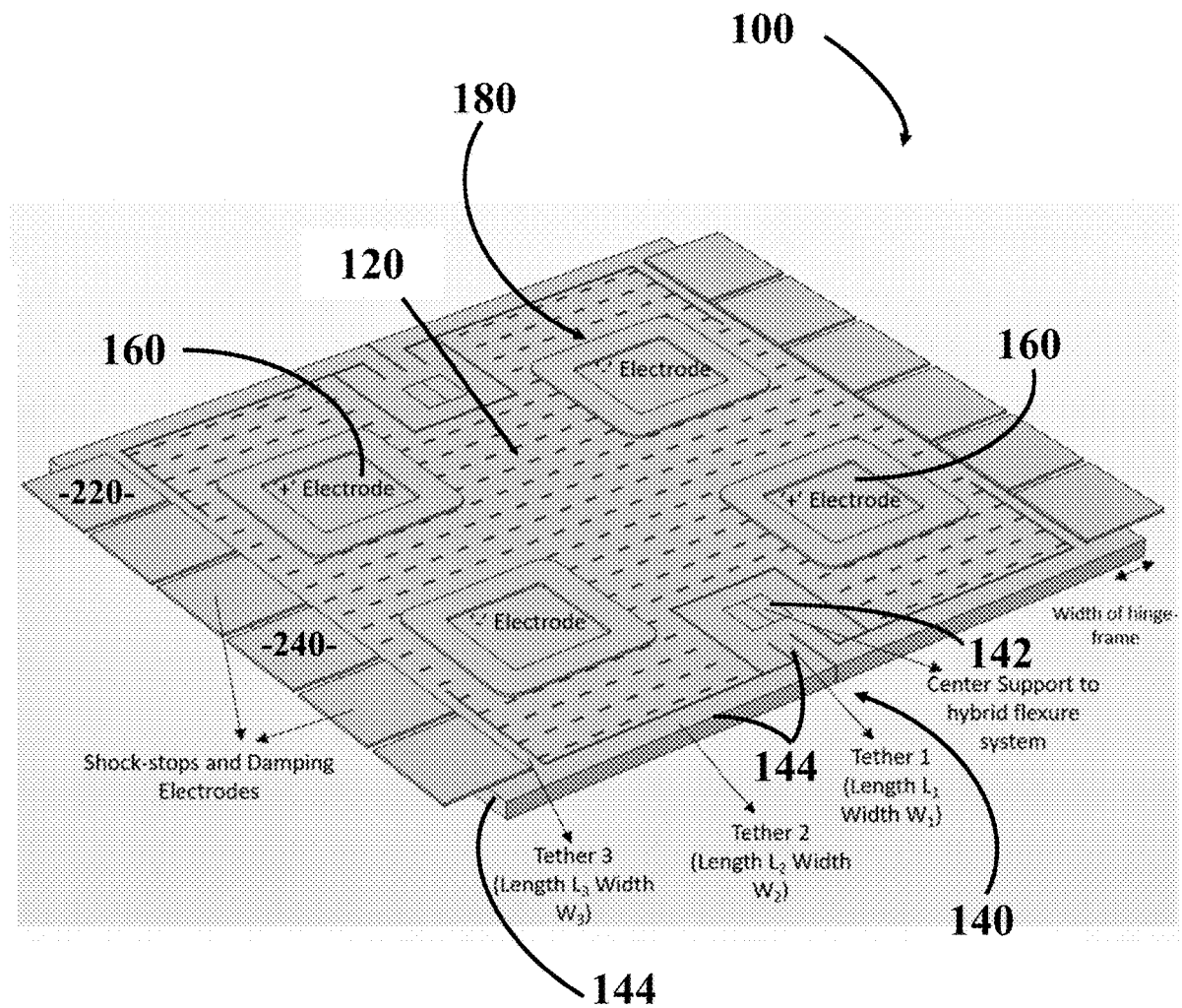
FIG. 3 is a schematic of the structural design of present device illustrating the hybrid flexure system comprising tethers 1, 2 and 3, the tethers with varying length and widths. The flexure system is fixed using a center support. The width of the hinge-frame is determined by the location of tether 3. Two pair of differential electrodes are placed diagonally and housed with the proof-mass. Shock-stops and damping electrodes are placed along the width of the hinge-frame.
Figure 4A:
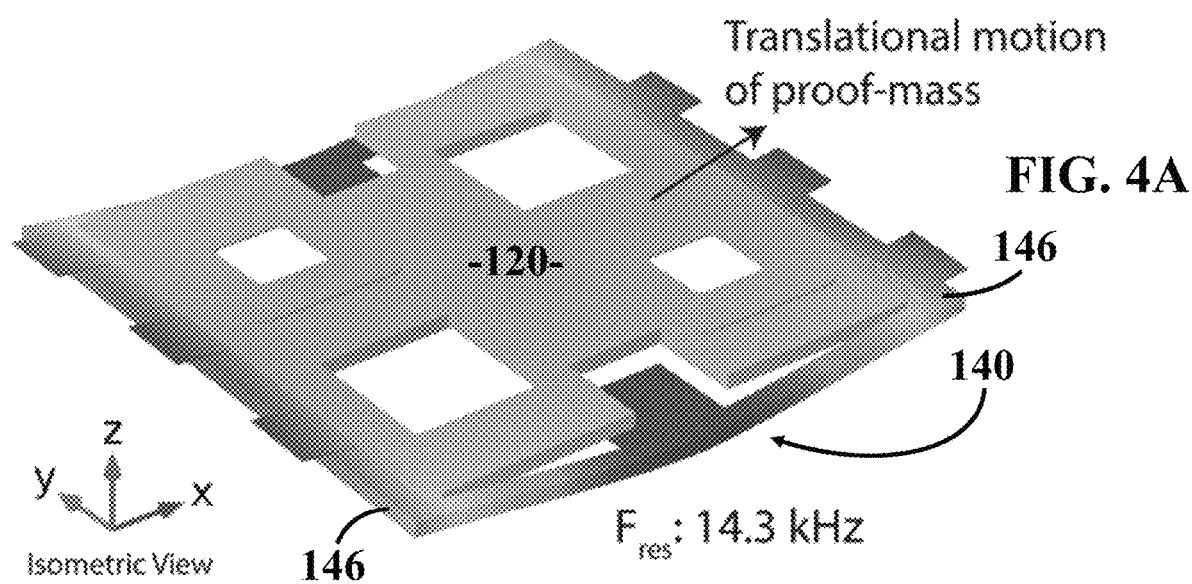
FIG. 4A illustrates a perspective view of a simulated operational mode shape of the present invention, with a resonant frequency of 14.3 kHz.
Figure 4B:
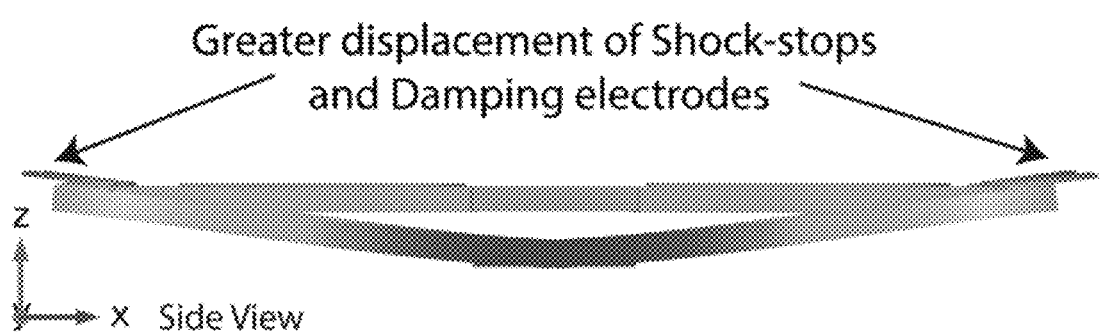
FIG. 4B illustrates a side view highlighting the torsional motion of the hinge-frame and translational motion of the proof-mass.
Figure 5A:
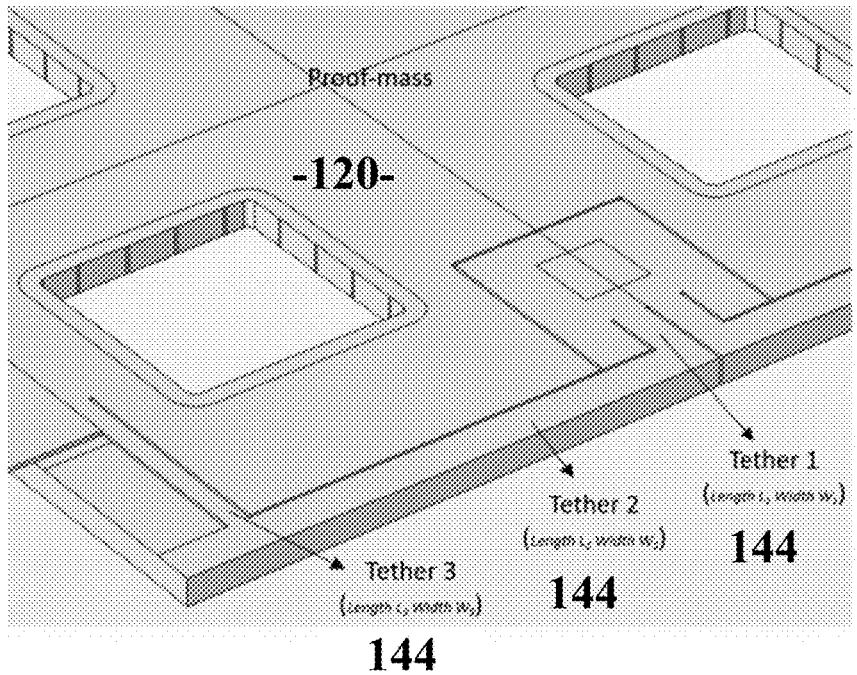
FIGS. 5A-5B show magnified views of the hybrid tether structure before and during proof-mass acceleration. The hybrid flexure system comprises tethers 1, 2 and 3 with varying length and widths. As shown, tethers 1 and 3 exhibit torsional motion, while tether 2 move translationally, providing high stiffness in the in-plane directions.
Figure 5B:
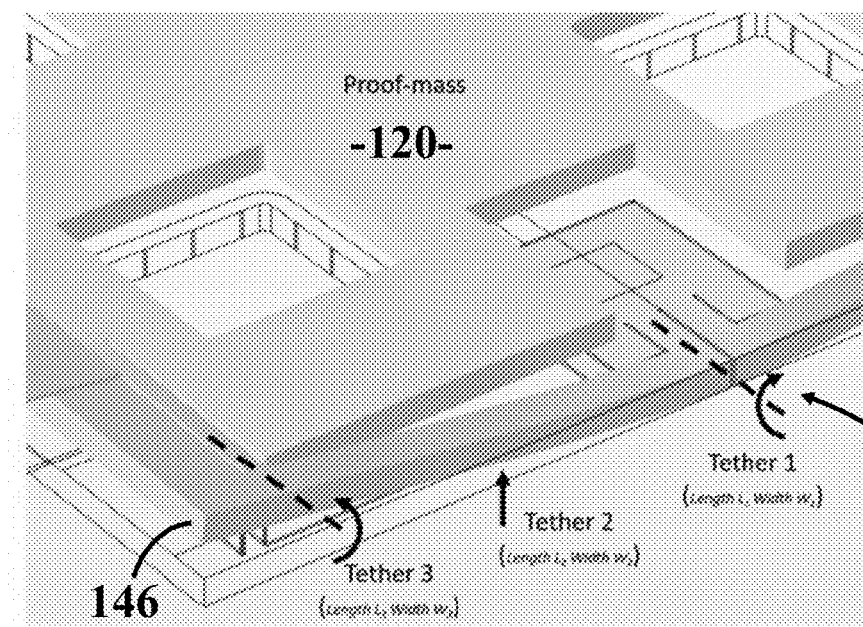

As shown in FIG. 3, the present invention 100 comprises a proof-mass 120, a supporting flexure (hybrid flexure system) 140 and at least one sensing electrode 160 that is separated from the proof-mass 120 by a sub-micron capacitive gap 180 and works in moderate vacuum. The device 100 can be fabricated using the high aspect-ratio combined poly- and single-crystal silicon micromachining technology (HARPSS) process on an SOI wafer and wafer-level packaged at sub-atmospheric pressure. The sub-micrometer capacitive gap 180 changes under external DC acceleration and vibration, and the sensing electrodes 160 function as a capacitive pick-up. The operational bandwidth of the device 100 is determined by the resonant frequency of the device, which can be controlled by adjusting the dimensions of the supporting flexure 140. A high resonant frequency (~20 kHz) is necessary to capture all acoustic vibrations in a very low noise device. A hermetically-sealed vacuum package of the device can be sued to provide stable operating conditions, reduce the effects of squeeze film damping to enable high operational bandwidth, as well as protects device from environmental and accidental damage.

The hybrid flexure system 140 enables the implementation of damping electrodes 220 and shock-stop features 240 in a MEMS devices that use a single transduction gap size in the out-of-plane direction.

The hybrid flexure system 140 can comprises of a center-supported hinge-frame 142 that in turn supports the device proof-mass using torsional beam flexures 144 for an out-of-plane translational motion. As shown in FIGS. 4A-4B, 5A-5B, upon externally applied acceleration, the proof-mass 120 moves translationally perpendicular to the plane, while the hinge-shaped frame 140 rotates about the center support 142. Due to this rotational motion, the edges 146 of the hinge-frame displace greater than the translational motion of the proof-mass 120 in the out-of-plane direction, effectively having different displacements at different locations within the same device.

The areas with higher displacement are utilized for implementation of damping electrode and shock-stop features 220, 240, while the areas with lower displacement are used to implement the sensing electrodes 160. The stiffness of the hybrid flexure system 140 (hinge-frame and torsional beam tethers 142, 144) is optimized by varying their length and width to ensure that the subsequent resonant modes of the device 100 are further apart from the fundamental mode of operation. This limits/prevents the sensitivity of the device 100 to in-plane and angular accelerations, and only responds to accelerations orthogonal to the plane.

Additionally, the location of the tethers 144 is tuned for maximum out-of-plane sensitivity while providing adequate device area for implementation of the damping electrodes 220 and shock-stop features 240 on the hinge-frame. The sensing electrodes 160 are placed within the proof-mass area to minimize the device footprint. FIG. 3 illustrates using two pair of differential electrodes 160, placed diagonally to cancel out effects of angular accelerations. Additionally, the translational motion of the proof-mass 120 facilitates a high effective mass, resulting in lowered Brownian noise floor.

The edges of the frame include the damping electrodes 220 and shock-stop structures 240, which are displaced greater than the proof-mass, thus causing additional damping under normal operation and limiting/preventing damage to the device under high-acceleration shock conditions.

Figure 6A:
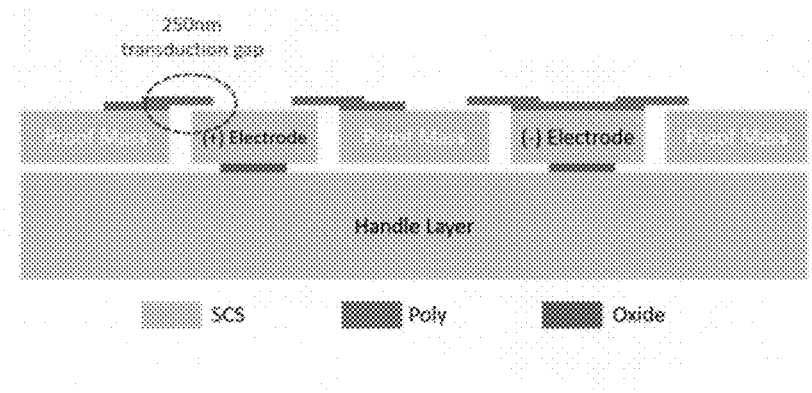
FIGS. 6A-6B provide end and perspective view schematics of differential electrode implementation. The differential electrode topology is implemented by fixing the polysilicon structure to the proof-mass at the '+' electrode, and creating an overhang using the polysilicon structure at the '−' electrode. This same principle is applied to the damping electrodes and shock stop features along the edge of the hinge-frame. Alternating damping electrodes are connected to the hinge-frame and the substrate to create an overhanging structure for enabling damping and shock stop ability.
Figure 6B:
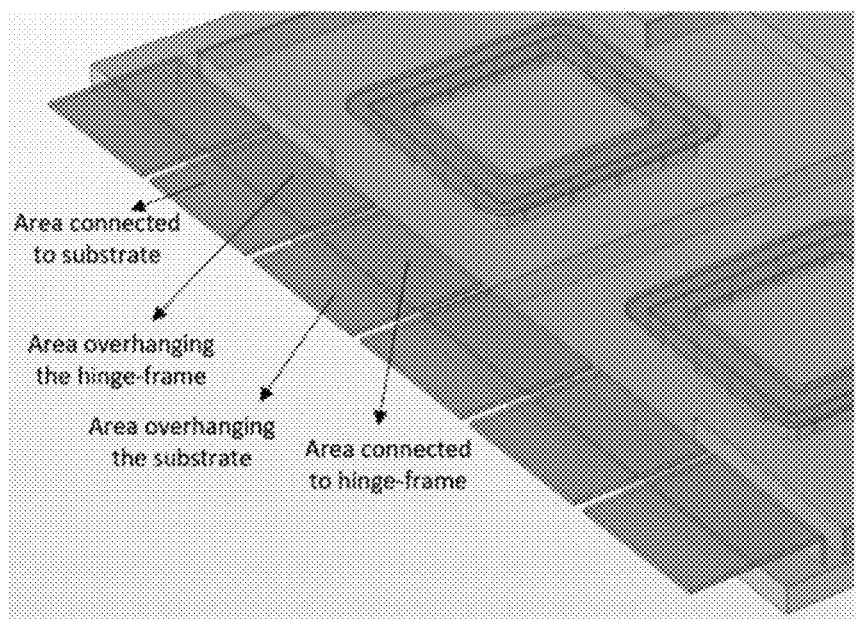
Figure 7:
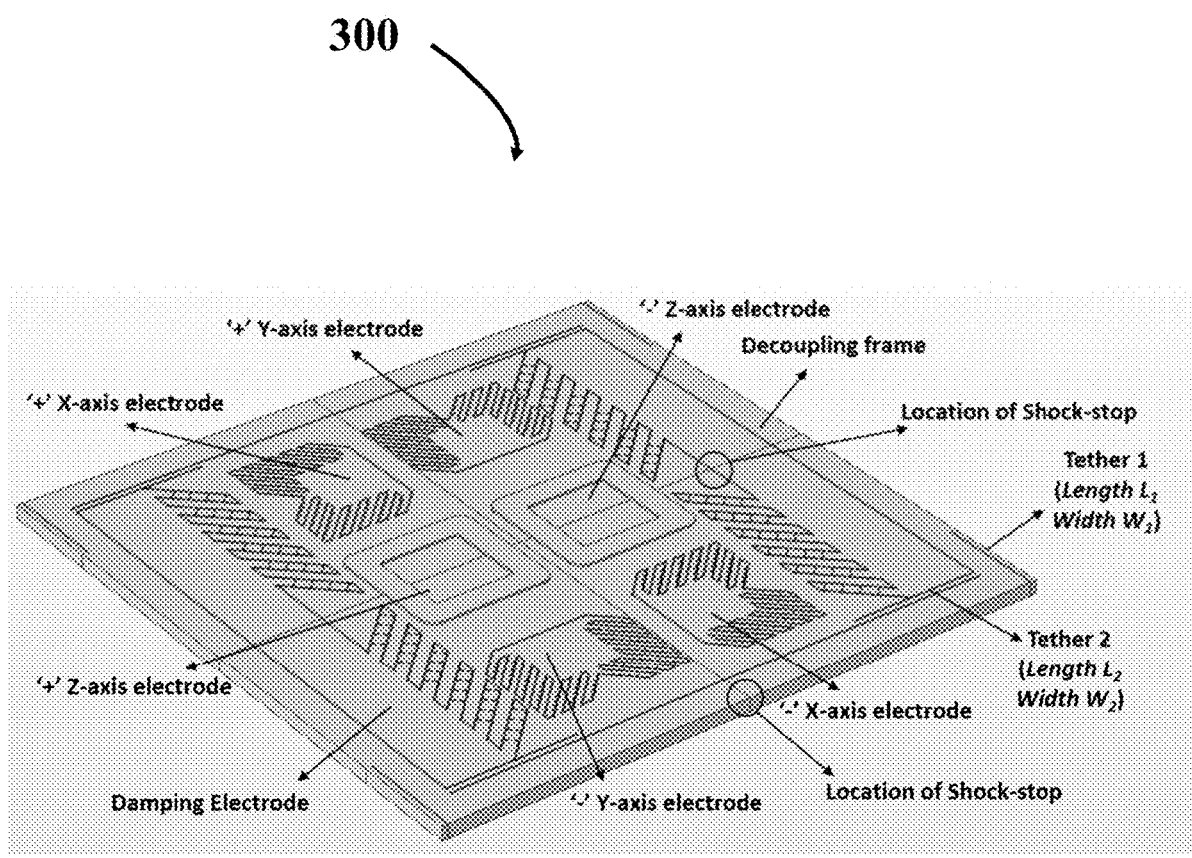
FIG. 7 presents the structural design of triaxial configuration of the device illustrating the decoupling frame system comprising tether 1 and 2 with varying length and widths and placed perpendicular to each other. Two pair of differential electrodes are used for sensing acceleration along each axis and are placed diagonally within the proof-mass to reduce effects of angular acceleration. Damping electrodes sloped at 45-degrees are used to enable damping along all orthogonal axes. Shock-stop features placed at multiple locations along the proof-mass and decoupling frame that exhibit maximum displacement.

As shown in FIGS. 6A-6B, the damping electrodes 220 can be placed in an alternating configuration along the hinge-frame, such that one electrode 220 is fixed to the device, while the next electrode 220 is fixed to the substrate. This allows the shock-stop to work efficiently in both directions—as the proof-mass displaces up and down.

In another exemplary embodiment of the present invention, FIGS. 7 and 8A-C show device 300 having a triaxial configuration, in which a decoupling frame is utilized to support the proof-mass. The support flexures are placed within the proof-mass area to reduce device size and are perpendicular to each other. The stiffness of these flexures is optimized to ensure that the resonant frequency of all three fundamental modes of operation are close to one another for comparable performance along each axis.

The decoupling frame structure enables sensitivity to microgravity level accelerations over a wide operational bandwidth along all the orthogonal axes. Additional fixed damping electrodes are placed within the device area to provide additional damping for stable operation under vacuum conditions. The fingers of the damping electrodes are sloped at a 45-degree angle to offer damping along both in-plane axes using the same electrode.

Additionally, a polysilicon top-electrode can be configured on these electrodes to provide damping in the out-of-plane direction as well. Shock-stop features are placed selectively at locations of maximum displacement along the proof-mass and decoupling frame to protect the device from mechanical shocks. This exemplary embodiment also uses one pair of differential sensing electrodes per sensing direction, which are placed diagonally to minimize the effects of angular accelerations.

FIG. 8A is an SEM image of this tri-axial accelophone embodiment. The microstructure includes a 2.5 mm×2.5 mm×40 µm single-crystal silicon proof-mass anchored at the edges to support the device. The translational-mode accelerometer 300 utilizes dedicated electrodes to enable differential capacitance sensing for each axis. The implementation of a fully differential gap-changing topology eliminates the need for reference capacitors and reduces second-order temperature effects, from degrading the sensor performance. More importantly, the tether structures supporting the proof-mass are embedded in the monocrystalline silicon device layer instead of being formed using polysilicon structures deposited on top of the device layer, which are sensitive to process variations such as film thickness and stress. This translates to more robustness and increases the structural reliability and reproducibility of the sensor.

The device 300 comprises three pairs of sensing electrodes, with the in-plane electrodes employed using the sloped-electrode configuration, while the out-of-plane sensing electrodes are implemented using differential top-electrode topology. The support tethers are located at the edge of the proof-mass, creating a decoupling moving frame that enables translational motion of the proof-mass along the X-, Y-, and Z-axis directions. Two pairs of in-plane and out-of-plane damping electrodes are also implemented at the edges and corners of the proof-mass in this design, as shown in FIG. 8A.

Figure 8C:
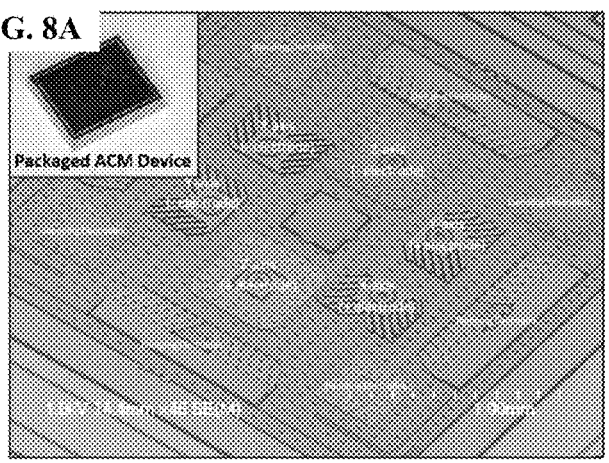
Figure 8C:
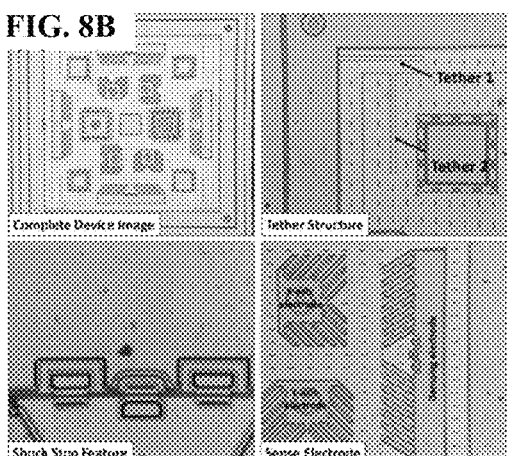
Figure 8C:
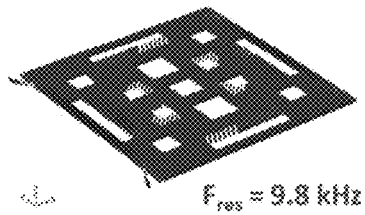
Figure 8C:
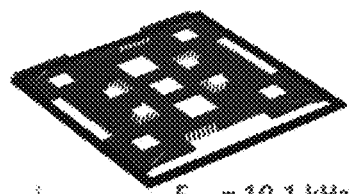
Figure 8C:
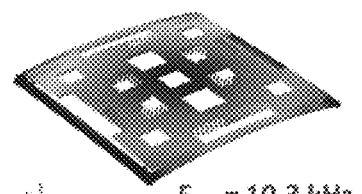

FEM simulations using COMSOL were conducted to analyze the device 300 comprehensively and optimize geometries for the tethers and electrodes. The dimensions of the tethers are designed to ensure consistent performance with mechanical noise floor below 7 µg/√Hz and resonant frequencies ~10 kHz along each direction as shown in FIG. 8C. The static capacitance on each electrode is optimized for maximum sensitivity, while reducing the amount of parasitic capacitance occurring due to the buried oxide layer underneath the electrode anchors.

The three-axis ACM device 300 is fabricated on an SOI wafer having 40 µm thick device layer and wafer-level-packaged, using the HARPSS+ process. The SEM photo of the acceleration sensor is shown in FIG. 3(a). FIG. 8B shows the close-up images of the sensing electrodes, damping electrodes and the shock stop structure.

A preliminary verification test is conducted using an LCR meter on wafer-level-packaged parts. The static capacitance is measured at each electrode along the in-plane and out-of-plane directions. The in-plane electrodes exhibit a static capacitance of 2.5 pF, while the out-of-plane electrode exhibit 3.5 pF. After validation of the sensing capacitances of the device, the sensor is interfaced with commercially-available off-the-shelf wideband capacitive readout electronics for performance characterization, which introduce significant additional noise in the system.

Figure 9:
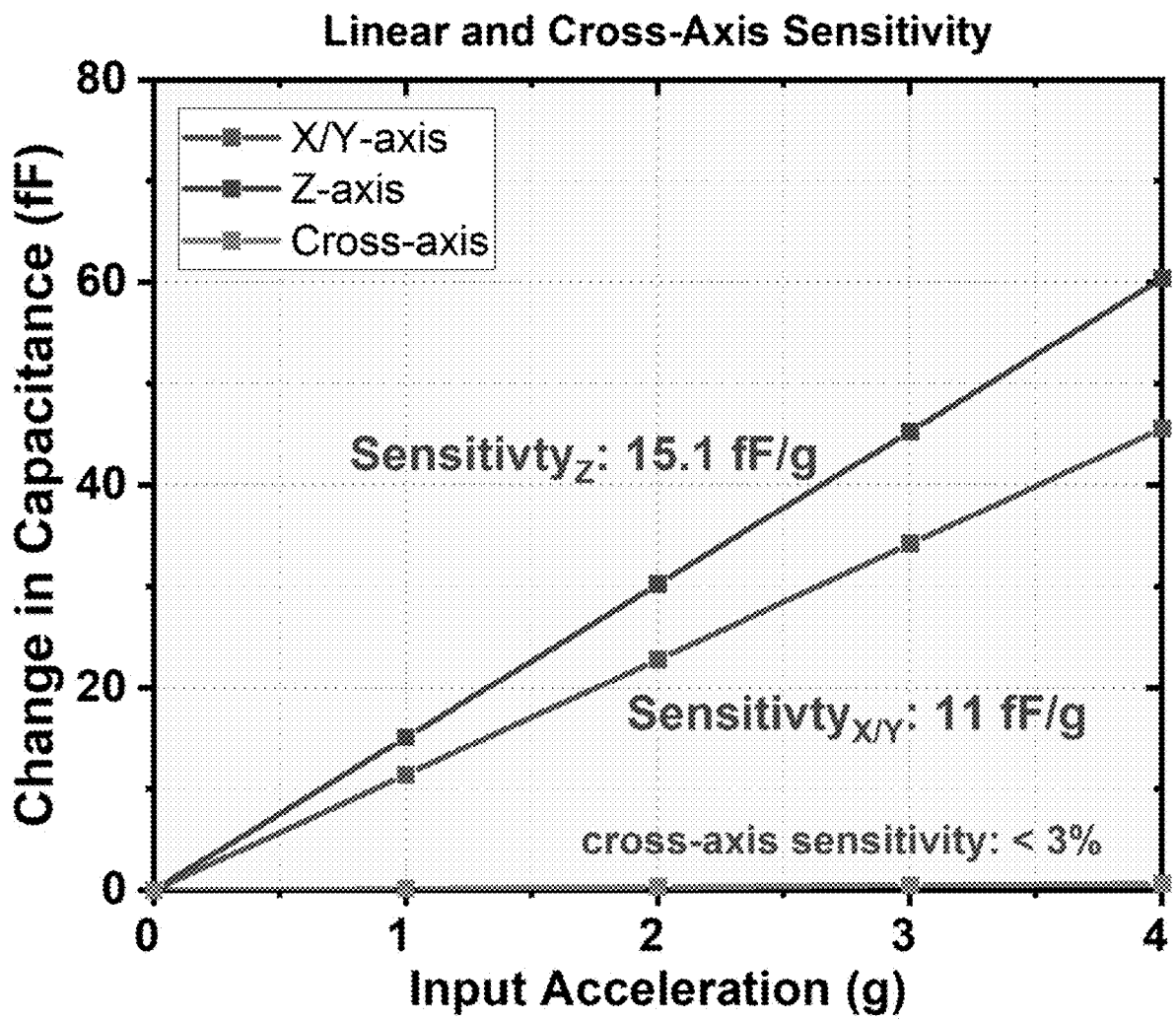
FIG. 9 is a graph of linear sensitivity of 11 fF/g and 15.1 fF/g along the in-plane and out-of-plane axes, respectively achieved using nano-scale transduction gaps. Cross-axis sensitivity is less than 3% along all axes (limited by mounting set-up).

First, the linear and cross-axis sensitivity along all three axes are measured by placing the device on a shaker table. The scale factors are measured to be 11 fF/g and 15.1 fF/g along the in-plane and out-of-plane axes, respectively as shown in FIG. 9. Cross-axis sensitivities of less than 3% are measured along all directions, arising mainly from misalignment of the manually placed device fixture used in the measurement setup.

Figure 10:
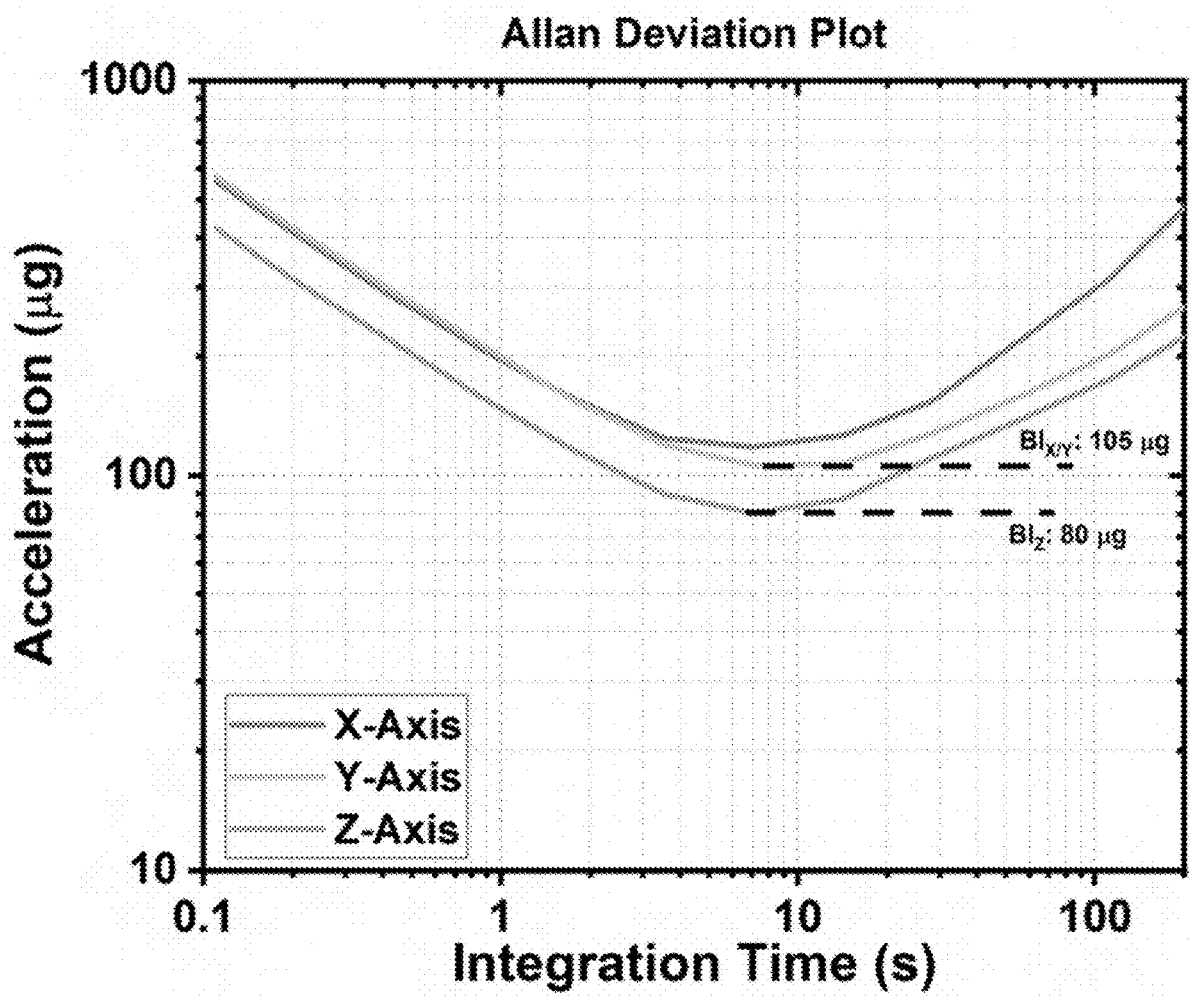
FIG. 10 is an Allan deviation plot for the three-axis ACM is evaluated by sampling the output signal for an extended period.
Figure 11:
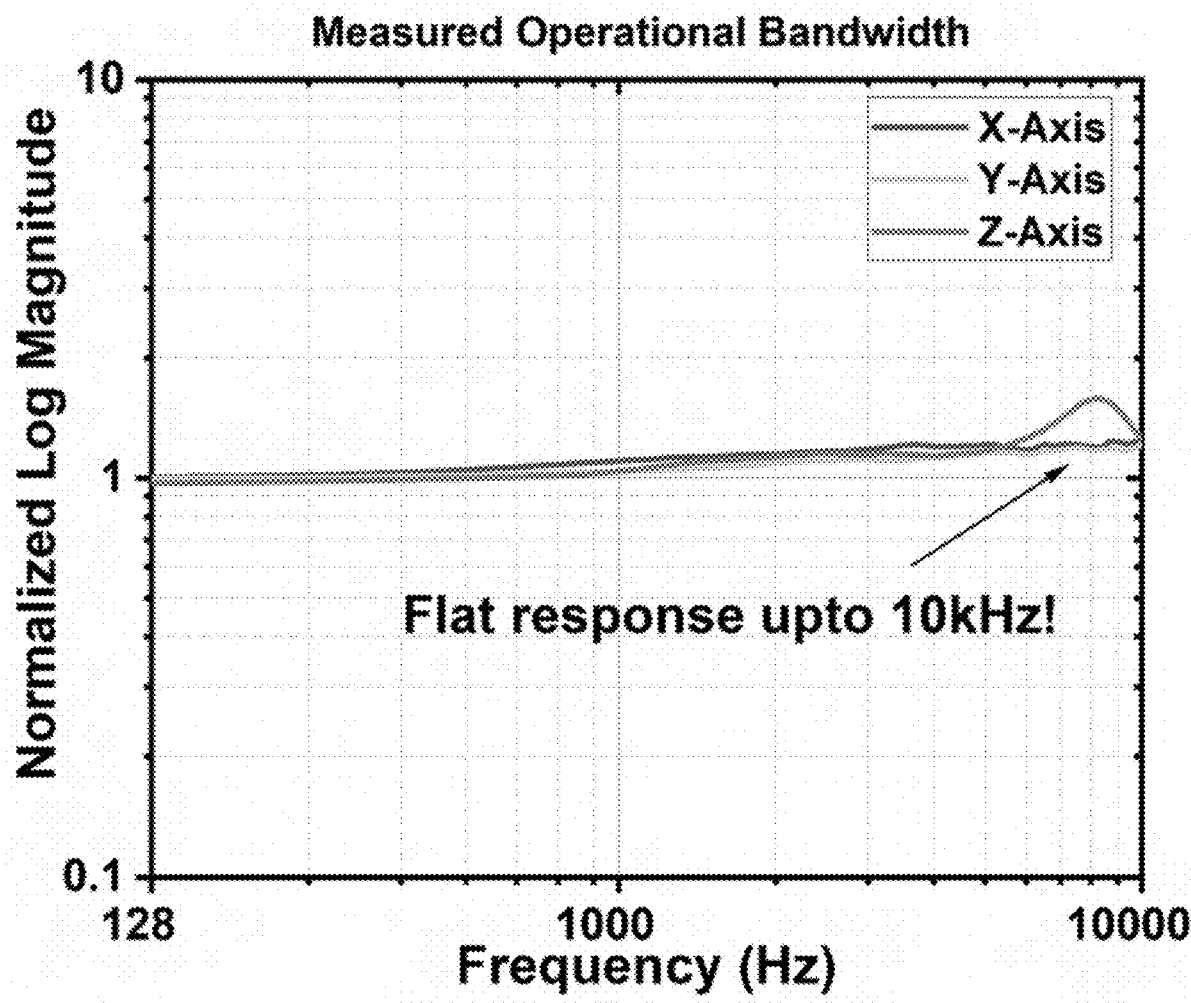
FIG. 11 is another graph illustrating ACM performance measured using off-the-shelf readout electronics. A near flat response up to 10 kHz indicated wide operational bandwidth.

The Allan deviation plots for the three-axis ACM is evaluated by sampling the output signal for an extended period, as shown in FIG. 10. Performance of each axis is measured individually while turning off the other axes. To measure the operational bandwidth of the device, each axis is individually interfaced to the readout circuit in succession during the measurement process. The device is placed on a shaker table and excited at frequencies from 10 Hz to 10 kHz. A near flat response up to 10 kHz is obtained along each axis, as shown in FIG. 11, verifying the larger than 10 kHz operational bandwidth of the sensor.

Table I provides a summary of the characterization results of the three-directional ACM prototype. These results verify the design and implementation of a low noise, wide bandwidth single-proof-mass three-axis ACM sensor. However, due to the noise limitations of the off-the-shelf interface electronics, the overall noise of the device+electronics is degraded. A low-noise interfaced IC capable of detecting 0.1 aF/√Hz will enable an ACM with a total noise equivalent acceleration of less than 10 µg/√Hz, mainly limited by the mechanical Brownian noise of the device.

TABLE I

| Parameter | Three-Axis ACM | | Units |
|---|---|---|---|
| Orientation | X/Y-axis | Z-axis | — |
| Size | 2.5 × 2.5 | | mm² |
| Resonant Frequency | 9.8, 10.1 | 10.3 | kHz |
| Operational Bandwidth | >10 | >10 | kHz |
| Measured Scale Factor | 11 | 15.1 | fF/g |
| Full Scale Range | ±40 (2% N.L.) | | g |
| | ±16 (0.5% N.L.) | | |
| Cross-Axis Sensitivity | <3 (measured) | | % |
| | <0.1% (simulated) | | |
| No. of Electrodes | 6 (2 per axis) | | — |
| Static Capacitance | 2.1 | 3.1 | pF |
| Brownian Noise Floor | 6.22 | 6.71 | µg/√HZ |

Compared to prior art, the advantages of using a torsional and a translational mode shape device are integrated into a single device, while eliminating the drawbacks of each of the methods. A conventional torsional device offers the advantages of easy implementation of shock stop structures due to larger displacement of one end of the device, but it susceptible to angular accelerations and exhibits low effective mass. In a conventional translational device, implementation of a shock-stop structure using a single transduction gap throughout the device is challenging, while introduction of multiple transduction gap sizes increases fabrication cost and complexity significantly. The disclosed embodiment overcomes these challenges using the hybrid flexure system to create a device with a single transduction gap along with shock-stop structures and high effective mass.

It will be clear to a person skilled in the art that features described in relation to any of the embodiments described above can be applicable interchangeably between the different embodiments. The embodiments described above are examples to illustrate various features of the invention.

The reader's attention is directed to all papers and documents which are filed concurrently with or previous to this specification in connection with this application and which are open to public inspection with this specification, and the contents of all such papers and documents are incorporated herein by reference.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

We claim:

1. A multi-axis device comprising:
a proof-mass;
a contiguous hinge-frame encircling the proof-mass, the contiguous hinge-frame designed to displace to a greater extent than, and in the same direction of, the proof-mass upon an externally applied acceleration;
a substrate;
a support system comprising a set of torsional support systems, the support system:
supporting the proof-mass to the contiguous hinge-frame (i) with the set of torsional support systems while inhibiting either cantilever motion or rotational motion of the proof-mass and (ii) in such a way that, upon the device experiencing the externally applied acceleration, the proof-mass is configured to undergo translational motion across all axes; and
supporting the contiguous hinge-frame to the substrate; and
a sensing electrode separated from the proof-mass by an out-of-plane sensing gap;
wherein, upon the device experiencing the externally applied acceleration, the proof-mass undergoes translational motion in an out-of-plane direction changing a size of the sensing gap, while a first set of opposing edges of the contiguous hinge-frame displace greater than the proof-mass in the out-of-plane direction resultant from the translational motion of the proof-mass; and wherein the proof-mass, contiguous hinge-frame, and support system are each formed in the same single layer.

2. The device of claim 1,
wherein the support system comprises a set of hybrid flexure systems;
wherein the contiguous hinge-frame supports the proof-mass with the set of hybrid flexure systems;
wherein upon the device experiencing the externally applied acceleration, the proof-mass undergoes translational motion only, in an out-of-plane direction, which changes the size of the sensing gap, while a first set of opposing edges of the hinge-frame displace greater than the proof-mass displaces resultant from the translational motion of the proof-mass;
wherein each edge of a second set of opposing edges of the contiguous hinge-frame comprises one of the hybrid flexure systems of the set of hybrid flexure systems; and
wherein a stiffness of the contiguous hinge-frame and hybrid flexure system is tunable to provide resonant modes of the device apart from a fundamental mode of operation of the device.

3. The device of claim 1, and
wherein upon the device experiencing the externally applied acceleration, the proof-mass undergoes only linear motion in an out-of-plane direction or an in-plane direction, changing the size of the out-of-plane sensing gap.

4. A multi-axis device comprising:
a proof-mass;
a contiguous hinge-frame encircling the proof-mass, the contiguous hinge-frame designed to displace to a greater extent than, and in the same direction of, the proof-mass upon an externally applied acceleration;
a substrate;
a support system comprising a set of torsional support systems, the support system:
supporting the proof-mass and configured to inhibit cantilever motion and rotational motion of the proof-mass; and
supporting the contiguous hinge-frame to the substrate; and
a sensing electrode separated from the proof-mass by an out-of-plane sensing gap;
wherein the proof-mass, contiguous hinge-frame, and support system are each formed in the same single layer; and
wherein, upon the device experiencing the externally applied acceleration, the proof-mass undergoes translational motion in an out-of-plane direction or an in-plane direction, changing the size of the out-of-plane sensing gap, while a first set of opposing edges of the hinge-frame displace greater than the proof-mass in the out-of-plane direction resultant from the translational motion of the proof-mass.

5. The device of claim 4, and wherein upon the device experiencing the externally applied acceleration, the proof-mass undergoes motion in an out-of-plane direction or an in-plane direction, changing the size of the out-of-plane sensing gap.

6. The device of claim 5, wherein the device is a multi-directional contact microphone; and wherein one or more: the proof-mass, the contiguous hinge-frame, the sensing electrode, and the out-of-plane sensing gap are enclosed within a casing configured to maintain a sub-atmospheric pressure; the multi-directional contact microphone has a constant-gain has a constant-gain frequency spectrum ranging from DC to greater than 10 kHz in at least one direction; the out-of-plane sensing gap is approximately 500 nanometers or less; an out-of-plane resolution of the multi-directional contact microphone is better than 10 micro-gravity per root Hz; and an integrated root mean square (rms) noise of the multi-directional contact microphone in a 10 kHz bandwidth is smaller than 0.1 percent of gravity level (g).

7. The device of claim 4, and wherein upon the device experiencing the externally applied acceleration, the proof-mass undergoes translational motion in an out-of-plane direction, changing the size of the out-of-plane sensing gap.

8. The device of claim 7, wherein the device is an accelerometer contact microphone (ACM); wherein the contiguous hinge-frame supports the proof-mass with the support system comprising a set of torsional support systems; and wherein upon the ACM experiencing the externally applied acceleration, a first set of opposing edges of the contiguous hinge-frame displace greater than the proof-mass displaces resultant from the translational motion of the proof-mass.

9. The device of claim 8, wherein each edge of a second set of opposing edges of the contiguous hinge-frame comprises one of the torsional support systems of the set of torsional support systems; wherein each torsional support system comprises: a center support; and torsional beam flexures; and wherein upon the ACM experiencing the externally applied acceleration, the first set of opposing edges of the contiguous hinge-frame displace greater than the proof-mass displaces resultant from the translational motion of the proof-mass via torsion of at least one of the torsional beam flexures about the center support.

10. The device of claim 8, wherein one or more:
the proof-mass, the contiguous hinge-frame, the sensing electrode, and the out-of-plane sensing gap are enclosed within a casing configured to maintain a sub-atmospheric pressure;
the proof-mass, the contiguous hinge-frame, the sensing electrode, and the out-of-plane sensing gap are enclosed within a casing configured to maintain a vacuum pressure of 1-10 Torr;
the ACM has a constant-gain frequency spectrum ranging from DC to greater than 10 kHz;
the ACM has an operational bandwidth determined by the resonant frequency of the ACM;
the ACM has an operational bandwidth determined by the resonant frequency of the ACM, and wherein the resonant frequency of the ACM is approximately 14.3 kHz;
the ACM has an operational bandwidth determined by the resonant frequency of the ACM, and wherein the resonant frequency of the ACM is tunable;
the out-of-plane sensing gap is approximately 250 nanometers or less;
an out-of-plane resolution of the ACM is better than 10 micro-gravity per root Hz; and
an integrated root mean square (rms) noise of the ACM in a 10 kHz bandwidth is smaller than 0.1 percent of gravity level (g).

11. The device of claim 8 further comprising at least one damping electrode and shock-stop feature in proximity to each edge of the first set of opposing edges of the contiguous hinge-frame.

12. The device of claim 7, wherein the device is an ACM;
wherein the contiguous hinge-frame supports the proof-mass with the support system comprising a set of hybrid flexure systems;

wherein upon the ACM experiencing the externally applied acceleration, a first set of opposing edges of the hinge-frame displace greater than the proof-mass displaces resultant from the translational motion of the proof-mass;

wherein each edge of a second set of opposing edges of the contiguous hinge-frame comprises one of the hybrid flexure systems of the set of hybrid flexure systems; and wherein a stiffness of the contiguous hinge-frame and hybrid flexure system is tunable to provide resonant modes of the ACM apart from a fundamental mode of operation of the ACM.

13. The device of claim 12, wherein one or more:
the stiffness of the contiguous hinge-frame and hybrid flexure system is tunable to limit sensitivity of the ACM to externally applied in-plane and angular accelerations;
the stiffness of the contiguous hinge-frame and hybrid flexure system is tunable to limit sensitivity of the ACM to only out-of-plane accelerations, being orthogonal to the plane; and
each hybrid flexure system comprises:
a center support; and
torsional beam flexures; and
wherein upon the ACM experiencing the externally applied acceleration, the first set of opposing edges of the contiguous hinge-frame displace greater than the proof-mass displaces resultant from the translational motion of the proof-mass via torsion of at least two of the torsional beam flexures about the center support.

14. The device of claim 12 further comprising at least one damping electrode and shock-stop feature in proximity to each edge of the first set of opposing edges of the contiguous hinge-frame.

15. The device of claim 12 further comprising: damping electrodes; and
shock-stop features;
wherein each edge of the first set of opposing edges of the contiguous hinge-frame comprises the damping electrodes and shock-stop features in an alternating configuration along a length of each edge; and
wherein the damping electrodes are alternatingly fixed to the contiguous hinge-frame and fixed to the substrate along the length of each edge.

16. The device of claim 4, wherein the device is a microelectromechanical system (MEMS) device; wherein the sensing gap is approximately 1000 nanometers or less; and wherein the MEMS device has a constant-gain operational bandwidth ranging from 0 Hz to at least greater than 10 kHz.

17. The device of claim 16, wherein the proof-mass, the contiguous hinge-frame, the sensing electrode, and the sensing gap are enclosed within a casing configured to maintain a sub-atmospheric pressure; wherein the proof-mass, the contiguous hinge-frame, the sensing electrode, and the sensing gap are enclosed within a casing configured to maintain a vacuum pressure of 1-10 Torr;
wherein a first resonant frequency of the MEMS device is greater than 10 kHz;
wherein upon the MEMS device experiencing the externally applied acceleration, the proof-mass has a uniform translational displacement in an out-of-plane direction, while opposing edges of the contiguous hinge-frame are displaced greater than the displacement of the proof-mass; and
wherein shock-stop features are located in proximity to the opposing edges of the contiguous hinge-frame, wherein upon the MEMS device experiencing the externally applied acceleration, the proof-mass has a uniform translational displacement in an out-of-plane direction, while the shock-stop features are displaced greater than the displacement of the proof-mass.

18. The device of claim 16 further comprising shock-stop features located in proximity to opposing edges of the contiguous hinge-frame; wherein the proof-mass, the frame, the sensing electrode, and the sensing gap are enclosed within a casing configured to maintain a sub-atmospheric pressure; wherein upon the MEMs device experiencing the externally applied acceleration, the proof-mass has a uniform translational displacement in an out-of-plane direction: while opposing edges of the contiguous hinge-frame are displaced greater than the displacement of the proof-mass; and while the shock-stop features are displaced greater than the displacement of the proof-mass; and wherein a first resonant frequency of the MEMs device is greater than 10 kHz.

19. A multi-axis microelectromechanical system (MEMS) device comprising:
a proof-mass;
sensing electrodes, each sensing electrode separated from the proof-mass by a sensing gap;
a contiguous hinge-frame encircling the proof-mass and supporting the proof-mass with a support system, the contiguous hinge-frame configured to, upon the MEMS device experiencing an externally applied acceleration:
displace to a greater extent than, and in a same direction of, the proof-mass, thereby changing a size of the sensing gap in the same direction while a first set of opposing edges of the contiguous hinge-frame displace greater than the proof-mass in the same direction resultant from translational motion of the proof-mass resultant from the externally applied acceleration;
enable the proof-mass to undergo translational motion across all axes;
inhibit the proof-mass from undergoing cantilever motion; and
inhibit the proof-mass from undergoing rotational motion; and
a substrate;
wherein the support system supports the contiguous hinge-frame to the substrate; and
wherein the proof-mass, contiguous hinge-frame, and support system are each formed in the same single layer.

20. The MEMS device of claim 19, wherein the proof-mass includes one or more sets of apertures;
wherein each aperture of the proof-mass has positioned therein one sensing electrode of the sensing electrodes;
wherein each sensing gap is approximately 1000 nanometers or less; and
wherein the MEMS device has a constant-gain operational bandwidth ranging from 0 Hz to at least greater than 10 kHz.

21. The MEMS device of claim 20, wherein each sensing gap is the same size, being uniformly sized among each sensing electrode and the proof-mass.

22. The MEMS device of claim 20, wherein at least two of the sensing gaps is a different size one from the other.

23. The MEMS device of claim 20, wherein each of the one or more sets of apertures includes a first aperture located a distance from the center of the proof-mass, and a second aperture located the same distance from the center of the proof-mass as the first aperture, but point reflected about the center of the proof-mass from the first aperture; and wherein the symmetrically-reflected locations of the sensing electrodes positioned in each set of apertures cancel the effect of angular accelerations of the MEMS device.

24. The MEMS device of claim 19 further comprising: damping electrodes; and shock-stop features;
wherein the support system is a hybrid flexure system comprising torsional beam flexures;
wherein the contiguous hinge-frame is a center-supported hinge-frame that supports the proof-mass using the torsional beam flexures;
wherein each sensing gap is a transduction out-of-plane gap having a single transduction out-of-plane gap size;
wherein upon the MEMS device experiencing the externally applied acceleration, the proof-mass undergoes translational motion in an out-of-plane direction, while the center-supported hinge-frame rotates about the center support so a first set of opposing edges of the center-supported hinge-frame are displaced greater than the displacement of the proof-mass;
wherein each edge of the first set of opposing edges comprises a portion of the damping electrodes and shock-stop features; and
wherein the hybrid flexure system enables implementation of the damping electrodes and shock-stop features in the MEMS device that uses the same single transduction out-of-plane gap size.

25. The MEMS device of claim 19, wherein the proof-mass has at least three sets of a pair of apertures, an X-mode set of a first aperture and a second aperture, a Y-mode set of a first aperture and a second aperture, and a Z-mode set of a first aperture and a second aperture;
wherein the sensing electrodes comprise at least three sets of a pair of sensing electrodes, an X-mode set of a first sensing electrode and a second sensing electrode, a Y-mode set of a first sensing electrode and a second sensing electrode, and a Z-mode set of a first sensing electrode and a second sensing electrode;
wherein in each corresponding set of apertures and sensing electrodes:
the first aperture is located a distance from the center of the proof-mass, and the second aperture is located the same distance from the center of the proof-mass as the first aperture, but point reflected about the center of the proof-mass from the first aperture;
the first sensing electrode is positioned in the first aperture;
the second sensing electrode is positioned in the second aperture; and
symmetrically-reflected locations of the first and second sensing electrodes cancel an effect of angular accelerations of the MEMS device;
wherein each sensing gap is approximately 1000 nanometers or less; and
wherein the MEMS device has a constant-gain operational bandwidth ranging from 0 Hz to at least greater than 10 kHz.

26. The MEMS device of claim 25, wherein all resonant frequencies of the MEMS device are greater than 10 kHz.

* * * * *